Figure 1:
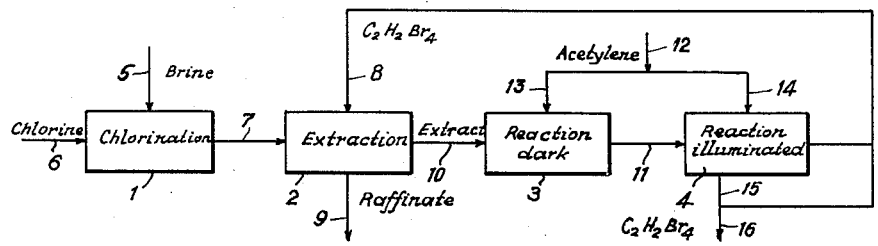

July 20, 1965 L. M. SHORR 3,196,099

PREPARATION OF 1,1,2,2-TETRABROMOETHANE

Filed April 11, 1962

INVENTOR.
Leonard Marshall Shorr
BY

United States Patent Office 3,196,099
Patented July 20, 1965

3,196,099
PREPARATION OF 1,1,2,2-TETRABROMO-
ETHANE
Leonard Marshall Shorr, Romema, Haifa, Israel, assignor, by mesne assignments, to Israel Mining Industries-Institute for Research and Development, a company of Israel
Filed Apr. 11, 1962, Ser. No. 186,720
Claims priority, application Israel, Apr. 28, 1961, 15,410
6 Claims. (Cl. 204—163)

This invention relates to the preparation of 1,1,2,2-tetrabromoethane (hereinafter for short tetrabromoethane).

By one known process for preparing tetrabromoethane, elementary bromine is contacted with acetylene in the vapour phase. This process leads to the formation of numerous by-products and has an accordingly poor yield of tetrabromoethane and its performance is inconvenient from a technical point of view since bromine vapours are highly corrosive and the apparatus must be made bromine-proof. It has also been suggested to bubble acetylene through liquid bromine. This process does not go to completion and, like the first-mentioned process, it also produces by-products and requires bromine-proof apparatus. Some of the by-products of both these processes are explosive and this fact makes the process all the more inconvenient.

It is known, furthermore, that light has a catalytic action promoting the formation of tetrabromoethane by the direct reaction of acetylene with bromine though the reaction can also proceed in the dark. However, it has now been found that in complete darkness the reaction does not proceed to completion.

The bromine used as a starting material for all known processes had to be in a pure, undiluted state. Its isolation from the aqueous brines in which it is usually prepared by the chlorination of bromides is a costly process.

The invention has the object to provide a process for the preparation of tetrabromoethane in which the bromine can be used in the form of a solution obtained in the course of its recovery from chlorinated bromide brines and which can be carried through to completion without any substantial formation of by-products.

According to the invention, a solution of bromine in tetrabromoethane containing not more than 200 g. of elementary bromine per liter is contacted in the liquid state with substantially the stoichiometrically required amount of acetylene in the absence of oxygen, and at least the last stage of the process, beginning when the greater part of the elementary bromine dissolved in the tetrabromoethane has reacted with acetylene, is carried out under conditions of illumination.

For the purpose of this invention, the term "illumination" means the access of visible light irrespective of its intensity. Of course, the intensity of the illumination has an influence on the speed of the reaction. In diffused daylight the reaction may take a long time to be completed and concentrated irradiation is, therefore, as a rule preferred. Light of wavelengths between 4000 and 5500 A. has been found to be particularly actinic as regards the reaction of bromine with acetylene in a liquid system. Where the process is carried out in transparent vessels the desired intensity of irradiation may be achieved either by the concentration of natural light, by means of mirrors or lenses, or by the use of lamps. In the case of opaque vessels, lamps have to be used.

The process according to the invention may be performed from the beginning to its completion under conditions of illumination. Where it is preferred not to resort to illumination during a first stage of the process, e.g. in order to save power, the illumination should set in when between about two-thirds and four-fifths of the bromine originally present in the elementary state have reacted with acetylene.

It is a particular advantage of the present invention that the process of preparation of tetrabromoethane can be combined directly with the production of elementary bromine from aqueous bromide brines such as sea water, bitterns or the like.

If tetrabromoethane is used for the extraction of bromine from such aqueous brines, the coefficient of distribution of bromine between the solvent and the aqueous raffinate allows the use of such quantities of the solvent that the extract has a bromine concentration at which the extract can be used without further adjustment as a starting material for the process of preparation of tetrabromoethane according to this invention.

Accordingly, the invention also provides a combined process which comprises the steps of chlorinating an aqueous bromide-containing brine, extracting the chlorinated brine with such a proportion of tetrabromoethane that the bromine content of the extract does not exceed 200 g. of elementary bromine per liter of extract, separating the extract from the brine, contacting the extract in the liquid state with substantially the stoichiometrically required amount of acetylene in the absence of oxygen and subjecting the liquid bromine-acetylene-tetrabromoethane reaction system to conditions of illumination at least during the last stage of the reaction, beginning when the greater part of the elementary bromine has reacted with acetylene.

In this combined process a suitable volume ratio of brine:solvent is of the order 10:1.

The process according to the invention, either in its simple form in which a solution of bromine in tetrabromoethane constitutes the starting material, or in the combined form starting from an aqueous bromide brine, can be carried out at the ambient temperature.

The process may be performed as a continuous process. The flow diagram represented in FIG. 1 of the annexed drawings shows how this can be done: four stations are represented by reaction vessels 1, 2, 3 and 4. The chlorination vessel 1 is continuously supplied with brine at 5 and with gaseous chlorine at 6. Brine containing liberated bromine flows continuously through conduit 7 into the extraction vessel 2 which is continuously supplied with recycled tetrabromoethane at 8 while spent raffinate brine is discharged at 9. The extract, being a solution of elementary bromine in tetrabromoethane, is continuously transferred through conduit 10 into the primary reaction vessel 3 and from the latter through conduit 11 into the secondary reaction vessel 4. From a common source 12, acetylene is continuously supplied to vessel 3 at 13 and to vessel 4 at 14. The vessel 3 is not illuminated, but the vessel 4 is illuminated. From vessel 4, tetrabromoethane is discharged at 15. A portion thereof is recycled through conduit 8 to the extraction vessel 2, another portion of tetrabromoethane is continuously drawn off at 16 as final product.

The process according to the invention is illustrated by the following example to which it is not limited. The apparatus referred to in the example is diagrammatically shown in FIG. 2 of the accompanying drawing.

Example

Into an aqueous brine containing 10 g. per liter of bromide ion, chlorine gas is introduced. The brine and chlorine are continuously supplied to a chlorination vessel (not shown in FIG. 2) at the ambient temperature in such relative proportions that all the bromide contained in the brine as bromide is liberated, i.e. the amount of chlorine must be equivalent to the bromide.

The chlorinated brine is extracted in several countercurrent stages, collectively symbolized in the diagram by the vessel 2 of FIG. 1, with tetrabromoethane in a brine-solvent volume ratio of 10:1. This operation produces, at the end of four to five minutes, an extract containing about 100 g. of bromine per liter.

Figure 2:
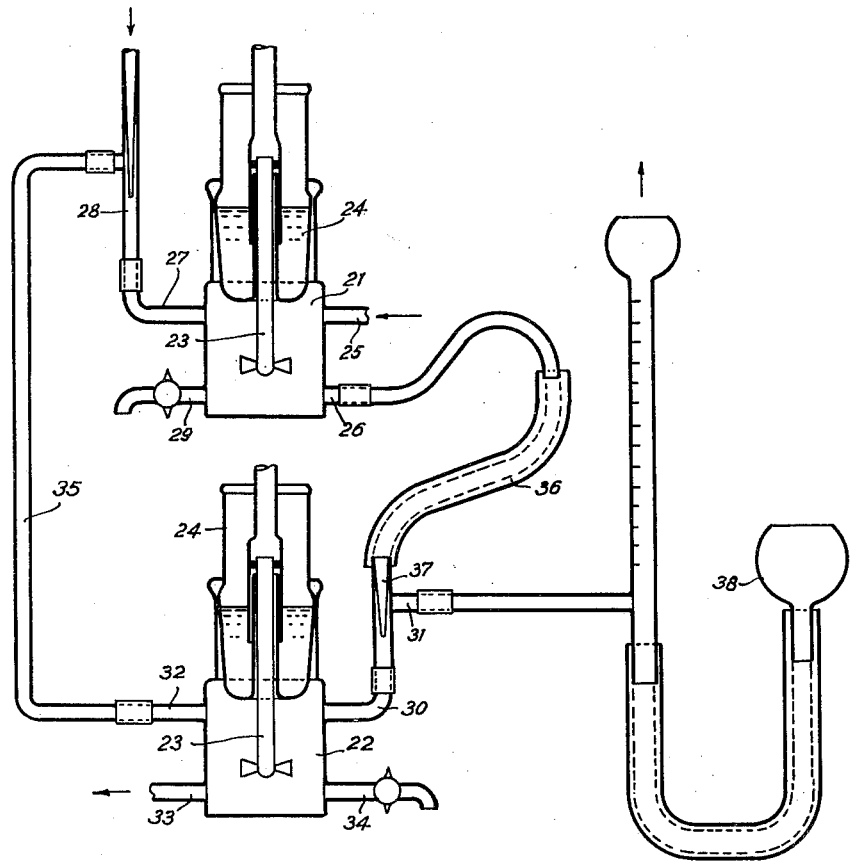

This extract is transferred to the reactor arrangement illustrated in FIG. 2. This comprises two identical reaction vessels 21 and 22 provided each with a stirrer 23 which is liquid-sealed as indicated at 24. Vessel 21 has an inlet 25 for the acetylene, an outlet 26 for the partly reacted tetrabromoethane-bromine solution, an upwards bent inlet 27 serving an inlet for the fresh tetrabromoethane-bromine solution and at the same time an outlet for the non-reacted acetylene. The inlet 27 is connected to a T-piece 28, and a tap 29 is provided for the complete evacuation of vessel 21 whenever required.

Vessel 22 comprises an upwards bent inlet 30 for the reaction mixture arriving from vessel 21, linked to a T-piece 31; a further inlet 32 for the acetylene arriving from vessel 21; an outlet 33 for pure tetrabromoethane and a tap 34 for the complete evacuation of the vessel whenever required.

The T-piece is connected to inlet 32 by a tube 35 and the outlet 26 is connected to the T-piece 31 by a bent tube 36 provided with a nozzle 37 which projects into the T-piece 31. The T-piece 31 is also connected to a soap bubble meter 38 serving for the detection of any non-reacted acetylene.

In a laboratory-scale performance of the process the vessels 21 and 22 measured each 38 mm. in diameter and 50 mm. in height, and the associated stirrers 23 were constituted each by a four-blade stirrer measuring 17 mm. across and capable of rotating at 1100–1300 r.p.m. The apparatus was freed from air by flushing it with acetylene and the tetrabromoethane-bromine solution was then fed into vessel 21 through inlet 27 at a rate of 8 ml per minute, so that the residence time of the solution in the vessel was 2.5 min. At the same time acetylene was fed into vessel 21 at a rate of 60.0 ml. per minute.

The solution leaving vessel 21 through outlet 26 had only 20–30% of the original content of elementary bromine, the rest having reacted with acetylene. The solution flowed through tube 36, T-piece 31 and inlet 30 into vessel 22. At the same time the non-reacted acetylene left vessel 21 through inlet 27 and was discharged through tube 35 into vessel 22. The reaction mixture inside vessel 22 was illuminated with a 7-watt mercury lamp. After a short running-in period no acetylene was detected by the soap bubble meter 38 and virtually pure tetrabromoethane was discharged from outlet 33 of vessel 22 at the rate of 8 ml. per minute. Approximately 96% thereof was recycled to the extraction stage whilst the remainder constituted the final product. Yield, 99% calculated on the acetylene used.

I claim:

1. A process for the preparation of tetrabromoethane, wherein a solution of bromine in tetrabromoethane containing not more than 200 g. of elementary bromine per liter is contacted in the liquid state with substantially the stoichiometrically required amount of acetylene in the absence of oxygen, and the last stage of the process, beginning when the greater part of the elementary bromine has reacted with acetylene, is carried out under conditions of illumination.

2. A process for the preparation of tetrabromoethane, which process comprises the steps of chlorinating an aqueous bromide-containing brine, extracting bromine from the chlorinated brine with so much tetrabromoethane that the bromine content of the extract does not exceed 200 g. of elementary bromine per liter of extract, separating the extract from the brine, contacting the extract in the liquid state with substantially the stoichiometrically required amount of acetylene in the absence of oxygen and subjecting the liquid bromine-acetylene-tetrabromoethane reaction system to conditions of illumination during the last stage of the reaction, beginning when the greater part of the elementary bromine has reacted with acetylene.

3. A process according to claim 2, wherein the extraction of chlorinated brine with tetrabromoethane is carried out at a brine-solvent volume ratio of about 10:1.

4. A process according to claim 1, wherein illumination is applied to the tetrabromoethane-bromine-acetylene reaction system after about two-thirds to four-fifths of the amount of elementary bromine used as a starting material has reacted with acetylene.

5. A process according to claim 1, wherein the illumination of the reaction mixture is carried out by means of light containing a preferential proportion of rays of wavelength of about 4000 to about 5500 A.

6. A process for the preparation of tetrabromoethane, wherein a solution of bromine in tetrabromoethane containing 100 to 200 grams of elementary bromine per liter is contacted in the liquid state with substantially the stoichiometrically required amount of acetylene in the absence of oxygen, and at least the last stage of the process, beginning when the greater part of the elementary bromine has reacted with acetylene, is carried out under conditions of illumination.

References Cited by the Examiner

UNITED STATES PATENTS

| 908,051 | 12/08 | Voigt | 260—660 |
| 1,932,590 | 10/33 | Kaselitz | 260—660 |
| 3,025,332 | 3/62 | Deprez | 260—694 |

FOREIGN PATENTS

| 217,906 | 10/58 | Australia. |
| 879 | 3/14 | Great Britain. |

JOHN H. MACK, Primary Examiner.

JOHN R. SPECK, Examiner.